INHIBITABLE RANDOM PULSE GENERATOR

Filed Nov. 4, 1971 3 Sheets-Sheet 1

INHIBITABLE RANDOM PULSE GENERATOR

United States Patent Office 3,716,797
Patented Feb. 13, 1973

3,716,797
INHIBITABLE RANDOM PULSE GENERATOR

Melvin C. Hendrickson, Elmhurst, and Richard G. Merrell, Darien, Ill., assignors to Zenith Radio Corporation, Chicago, Ill.

Filed Nov. 4, 1971, Ser. No. 195,728
Int. Cl. H03b 29/00
U.S. Cl. 328—63 6 Claims

ABSTRACT OF THE DISCLOSURE

An inhibitable random pulse generator for a subscription television system or the like generates an output pulse indicative of a random one of a plurality of possible counting states, one or more of which may be inhibited to narrow selection to the remaining states. A plurality of logic elements within the generator are connected in a novel mutually-exclusive circuit whereby one and only one can produce an output at a time. Individual sources of random noise applied to each element produce an output from an unpredictable one of the elements. Provision is made for inhibiting selected generator outputs by preventing the application of noise to the associated element, and a test mode is provided wherein timing pulses are applied to the elements to obtain a repetitive predictable output.

BACKGROUND OF THE INVENTION

This application is directed to subscription television encoding systems, and more particularly to an improved inhibitable random pulse generator for use therein.

In a preferred subscription television system such as that described in detail in Pat. No. 3,244,806, issued Apr. 5, 1966 to George V. Morris and assigned to the present assignee, a transmitted video signal is protected against unauthorized reception by switching it between one operating mode, wherein the video signal is delayed, and another operating mode wherein it is translated without delay. The mode changes are made several times during each field in response to the amplitude variations of a rectangular-shaped switching signal developed in an encoder at the studio, giving the effect of a plurality of alternately displaced horizontal bands across the coded picture. As a further protection against unauthorized reception, the phase of the rectangular switching signal is varied randomly at random intervals, in response to a series of random-state control pulses from an inhibitable random pulse generator, giving a jittered effect to the picture as the alternately displaced bands vertically shift position in a random manner.

In order to decode this signal for application to a subscriber's television receiver, it is necessary to reconstruct within a decoder in the subscriber's home a rectangular switching signal in exact phase synchronism with its randomly varying parent at the studio. To this end, a series of synchronizing bursts are periodically transmitted in time coincidence with the random control pulses and at discrete frequencies representative of the state thereof. To maintain system security it is desirable that the number of frequencies of these synchronizing bursts be varied in a random manner and with redundancy, subject only to certain inhibitions recognizable in reconstructing the rectangular switching signal. These inhibitions are necessarily reflected in the generation of the control pulses, and it is to an inhibitable random pulse generator for generating the random control pulses with the necessary inhibitions that the present application is directed. Certain features of the disclosed inhibitable random pulse generator are claimed in the co-pending application of Melvin C. Hendrickson, Ser. No. 195,717, filed on Nov. 4, 1971.

SUMMARY OF THE INVENTION

Accordingly, it is an object of the present invention to provide a new and improved inhibitable random pulse generator for use in a subscription television system or the like.

It is a more specific object of the invention to provide a new and improved random pulse generator which is less complicated and more economical to construct.

It is a still more specific object of the invention to provide a random pulse generator having a test mode wherein all possible outputs are generated in a re-occurring predictable sequence.

In accordance with the invention a random pulse generator for use in a subscription television system or the like comprises first, second and third logic elements each having at least two input terminals and an output terminal, and each normally occupying a first state but assuming a second state in the presence of a predetermined control effect on one or more of the input terminals, and each producing a control effect representative of its occupied state at the output electrode; means for coupling the control effect from the first logic element to one input terminal on each of the second and third elements to restrict the second and third elements to the second state when the first element is in the first state; means for coupling the control effect from the second logic element to one input terminal of the first element and the remaining input terminal of the third element to restrict the first and third elements to the second state when the second element is in the first state; means for coupling the control effect from the third logic element to the remaining input terminals of the first and second elements to restrict the first and second elements to the second state when the third element is in the first state; first, second and third sources of random noise pulse having sufficient amplitude and proper gender for restricting the elements to the second state; and means for applying the random noise pulses from the first, second and third sources to the output terminals of the first, second and third logic elements, respectively, to cause the one of the elements last to receive one of the random noise pulses to assume the first state.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Before considering the inhibitable random pulse generator of the invention, it is desirable to have a general working knowledge of the video encoder portion of the system in which it is employed. To this end, a preferred encoder is depicted in block diagram form in FIG. 1.

Figure 1:
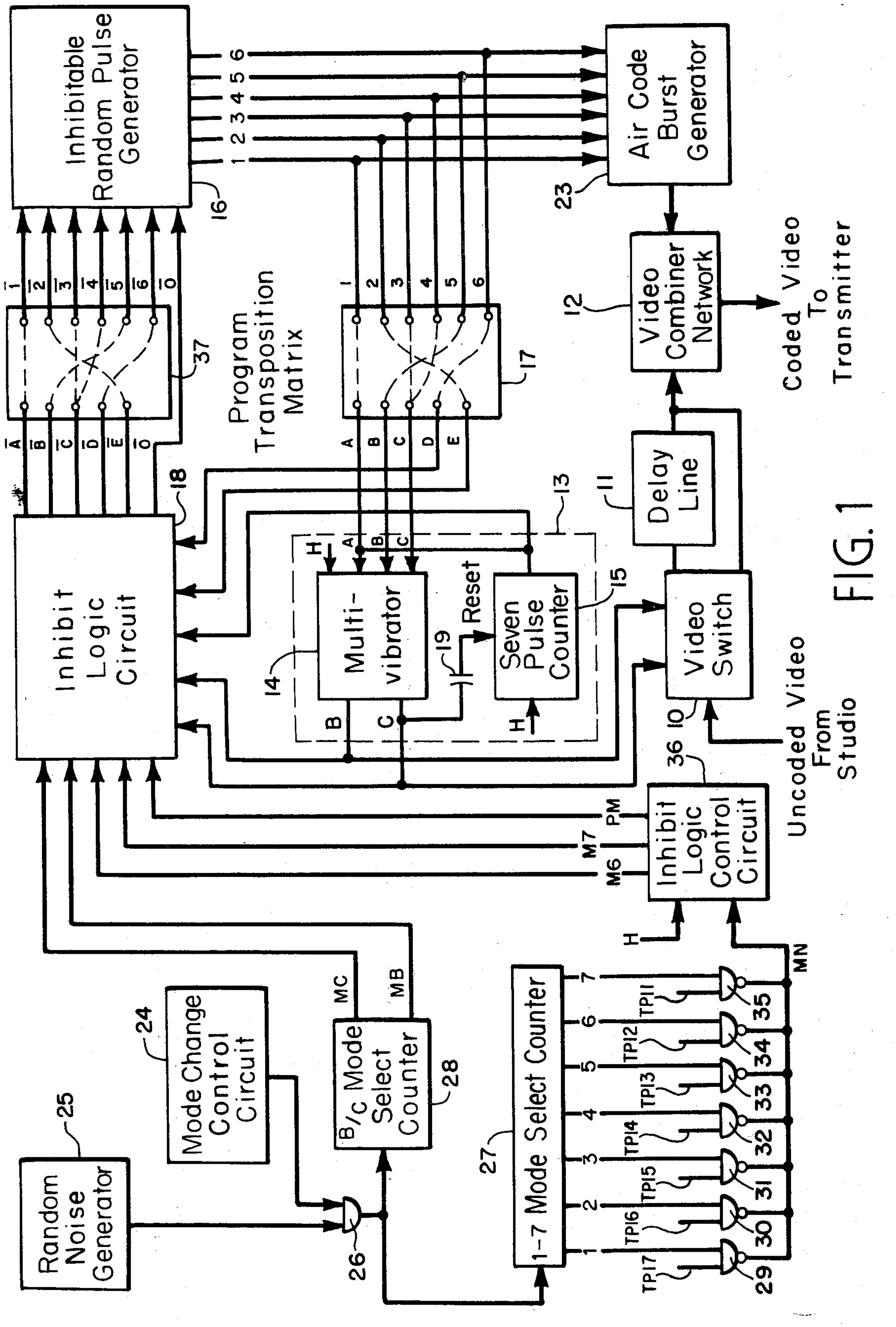
FIG. 1 is a block diagram of an encoder for a subscription television system embodying the present invention.

It will be recalled that prior to transmission in a preferred subscription television system the video signal is encoded by switching it alternately between delayed and undelayed modes several times during each fiield in response to a locally generated phase-varying rectangular switching signal. In the encoder of FIG. 1, encoding is accomplished by applying the uncoded video from the studio cameras and film chains to a video switch 10, which may comprise a pair of diodes alternately biased conductive and non-conductive or equivalent switching circuitry for directing the video signal to one of two outputs. One output of switch 10 is coupled to a delay line 11, which in accordance with current practice delays the video by approximately 1.675$\mu$ sec., or the duration of six cycles at the color subcarrier frequency. The other output is coupled through an appropriate matching network to a combining network 12, wherein the undelayed video is combined with the delayed video prior to further amplification and processing in the transmitter.

Video switch 10, after introducing a delay of one line to accommodate a like delay in decoding the synchronizing bursts in the decoders, switches between its two output states in response to a rectangular switching signal, which is generated by a mode square wave generator 13. Contained within generator 13 is a multivibrator 14 having two alternate quiescent states, hereinafter referred to as B and C. The push-pull output of multivibrator 14 is coupled via a pair of conductors to video switch 10 wherein it controls the functioning of that device.

Multivibrator 14 is not free-running, but instead switches between its two states in response to external control pulses applied to its three inputs, hereinafter designated A, B and C. The A input constitutes a toggle input, and pulses applied to this input cause the multivibrator to change state regardless of its present state. The B and C inputs force the multivibrator to transition to like-designated states only if it is in the opposite state, otherwise no change occurs. To generate the rectangular switching signal, the output of a seven pulse counter 15 is coupled to input A. This counter counter horizontal pulses, and following the occurrence of every seventh horizontal pulse generates a control pulse which toggles the multivibrator. This in effect makes generator 13 free-running, changing the mode of video switch 10 every seven lines to form alternately delayed and undelayed seven-line-wide horizontal bands across the picture.

To introduce an element of randomness into the system, the phase of the rectangular switching signal is randomly shifted. This is accomplished by means of an inhibitable random pulse generator 16, which periodically generates in ten predetermined time slots in each vertical retrace interval a series of ten control effects each representative of a random one of seven possible counting states; six of these manifested in the form of a pulse on a respective one of six output terminals, and the seventh in the form of no output pulse at all. The six pulses are assigned certain functions, among them being the control of mode square wave generator 13. This assignment is accomplished by means of a program transposition matrix 17, which has the capability of coupling any of the six pulse outputs of generator 16 to any of five function circuits, to introduced an additional permutation level into the system for program identification and billing purposes. The five function circuits are arbitrarily designated A, B, C, D and E. A, B and C connect to their like-lettered inputs on multivibrator 14, and D and E connect to end-of-program and correlation control circuitry, respectively, in an inhibit logic circuit 18 which will be discussed later. In the encoder of FIG. 1, matrix 17 has been wired so that a 1 pulse from random pulse generator 16 toggles multivibrator 14 at its A input, a 3 pulse forces multivibrator 14 to its C state, and a 5 pulse forces multivibrator 14 to its B state. Thus the possibility exists that the mode of generator 13 will be changed whenever one of these pulses is generated, depending on the state of multivibrator 14 at the time of generation.

In practice, multivibrator 14 is actually a two-stage circuit, comprising an input stage and an output or buffer stage. Pulses from generator 16 are applied to the input stage only during the ten time slots of the air code burst interval, i.e., the portion of the vertical retrace interval reserved for effecting phase changes in the rectangular switching signal. During each of these ten time slots the input stage of multivibrator 14, which may comprise a conventional J–K flip-flop, changes state in response to the occurrence of A, B, or C pulses from generator 16, finally assuming as a result of these pulses a B or C state at the end of each slot. The changes of state of the input stage are prevented from appearing at the output of multivibrator 14 by the buffer stage, which is gated to assume the state of the input flip-flop only during horizontal retrace intervals. This stage may take the form of a conventional J–K flip-flop having its J and K input terminals coupled to the Q and Q output terminals of the input flip-flop and its clock terminal coupled to a source of horizontal retrace pulses. With this arrangement the output of multivibrator 14 is changed only during horizontal retrace intervals to the state finally assumed by the input flip-flop at the end of the preceding time slot.

Once the output state of multivibrator 14 has been thus determined, it remains in that state throughout the succeeding time slot, notwithstanding that its input stage may be responding to pulses from generator 16 towards determining the state for the next time slot. This process takes place ten times during each vertical retrace interval; corresponding to respective ones of the ten time slots of the air code burst interval.

Once the air code burst interval has ended, seven pulse counter 15 continues to toggle multivibrator 14 every seventh horizontal line to sustain the rectangular switching signal for the duration of the succeeding field. To insure that following the air code burst interval multivibrator 14 will run at whatever phase is established by the preceding ten control effects from inhibitable random pulse generator 16, and not be returned to its previous phase by the first output from seven pulse counter 15, a reset of counter 15 is automatically accomplished following each C to B transition forced by the pulses from generator 16 during the air code burst interval. This is accomplished circuit-wise by a capacitor 19 connected between the C output of multivibrator 14 and the reset input of seven pulse counter 15, which together with the internal impedance of the counter form a differentiating network for converting C to B transitions to suitable reset pulses.

The final phase of the rectangular switching signal depends only on the final C to B transition, or phase transition point, since it is only that transition which resets the seven pulse counter to establish a new free-runing phase. This can better be seen in FIG. 2, which is a timing chart of various encoder signals during the phase change portion of a vertical retrace interval. The vertical interval is seen to comprise 24 timing slots, each one a single horizontal line in duration and consecutively numbered 1 through 24. The air code burst interval occupies slots 11 through 20 inclusive, and it is during these ten slots that the phase-determing pulses are generated. For purposes of explanation we will assume that generator 16 produced the illustrated series of pulses during this interval; namely AECCOBBCOC, with O indicating the absence of a pulse.

The phase of the rectangular switching signal has come to be designated as a mode identified with a single numeral and a single letter; the numeral specifying the number of time slots the phase (or mode) transition point (or last reset of the seven pulse counter) precedes the end of the air code burst interval, and the letter indicating the instantaneous state (B or C) of the rectangular switching signal at the end of the air code burst interval. Since seven pulse counter 15 toggles multivibrator 14 every 7 lines, the rectangular switching signal has a period of 14 lines or time slots, and hence 14 possible modes; 1B–7B and 1C–7C.

Figure 2:
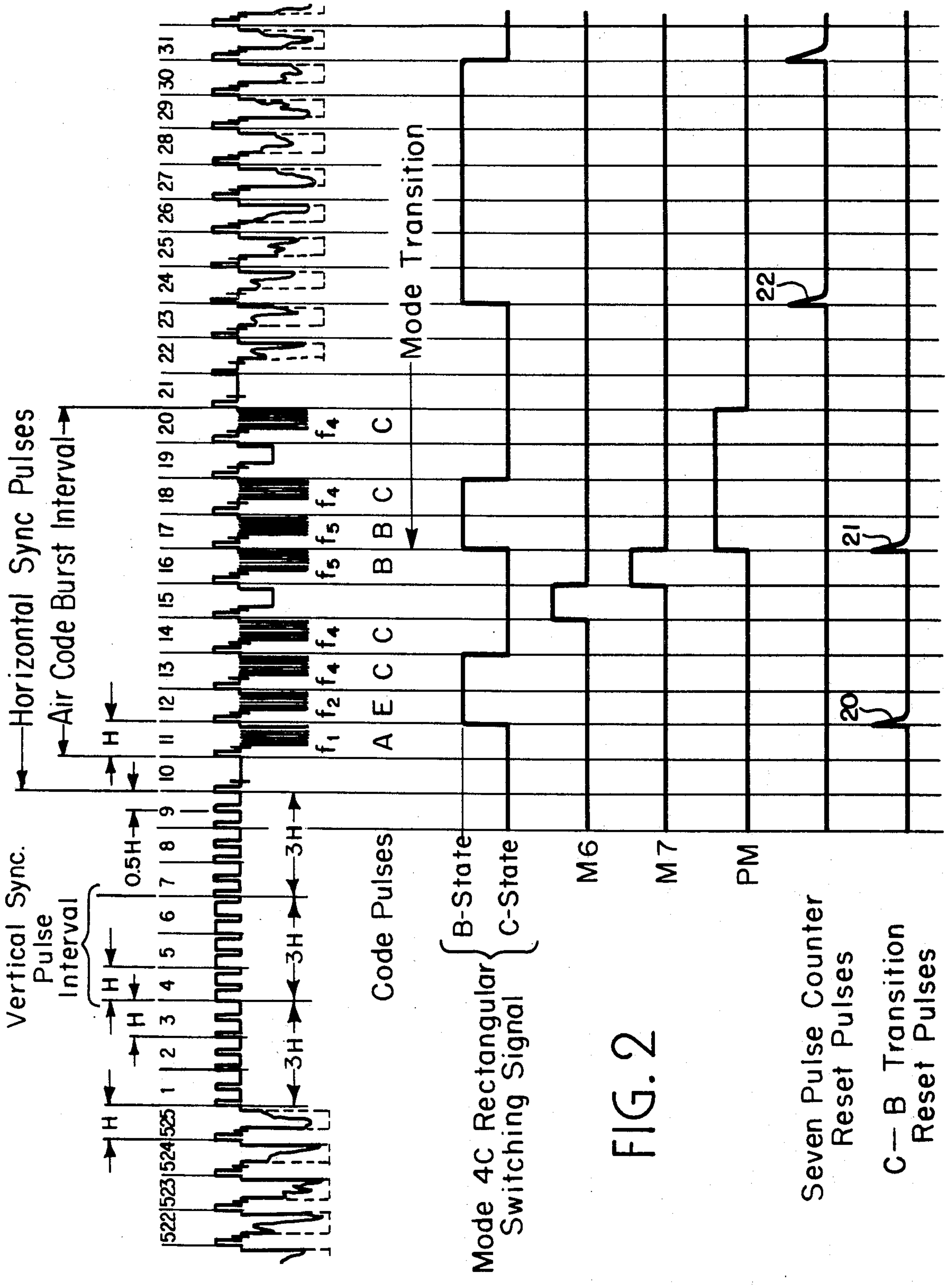
FIG. 2 is a graphical representation of signal waveforms useful in understanding the operation of the encoder of FIG. 1.

Reference is now made to the mode 4C waveform of FIG. 2, which was generated by the aforementioned series of pulses in a manner now to be described. The A pulse generated by generator 16 in time slot 11 toggled multivibrator 14, forcing the rectangular switching signal to transition from its C to B state between slots 11 and 12 and producing a reset pulse 20 for seven pulse counter 15. The correlation E pulse in slot 12 caused no change, and the C pulse in slot 13 forced a B to C transition between slots 13 and 14. The C pulse in slot 14 caused no change, since the rectangular switching signal was already in the C state. There was no pulse in slot 15, and hence no change. The B pulse in slot 16 forced a C to B transition between slots 16 and 17, the mode transition point for mode 4C operation, producing a reset pulse 21 which again reset seven pulse counter 15. The B pulse in slot 17 produced no change, and the C pulse in slot 18 forced a B to C transition. The absence of a pulse in slot 19 and the C pulse in slot 20 produced no change, leaving the rectangular switching signal in a C state at the end of the air code brust interval and seven pulse counter 15 with a 4 count as required by mode 4C. The switching signal remained in a C state until three time slots later, when seven pulse counter 15 reached a seven count and produced an output pulse 22 which toggled multivibrator 14 to its B mode. For the balance of the vertical scanning cycle counter 15 periodically toggled multivibrator 14 every seven horizontal lines, thus maintaining the rectangular switching signal in the 4C mode during the successive field and at least until the next vertical retrace interval.

In order for the decoder to decode the encoded signal at the subscriber's receiver it is necessary that the decoder locally reconstruct the rectangular switching signal at the same frequency and phase that it was generated at by multivibrator 14. To this end each of the output terminals 1–6 of random pulse generator 16 is connected to an assigned one of six gated discrete-burst-frequency oscillators in an air code burst generator 23. These six oscillators each have gated input stages, in the form of conventional J–K flip-flops the input terminals of which are coupled to respective ones of output terminals 1–6 of random pulse generator 16, and the clock control terminals of which are coupled to a source of horizontal retrace pulses. Thus connected, the input flip-flops perform in a manner similar to multivibrator 14, recognizing only the final output state of generator 16 as it exists upon the occurrence of the horizontal retrace interval following a horizontal scanning interval time slot.

Since it is possible for one and only one output pulse to be generated at one time by generator 16, it is possible for only one of the six input flip-flops to assume a transfer state during a particular retrace interval. Furthermore, once an input flip-flop has assumed its transfer state, it will remain in that state until the next horizontal retrace interval clock pulse, at which time it will return to its quiescent state if generator 16 heas assumed a different output state.

While the input flip-flop is in its transfer state, conventional gated oscillator circuitry produces a discrete-frequency burst signal in the range of 500–1000 kHz. This burst, necessarily of at least one time slot in duration, is combined with the composite video signal in combiner network 12 prior to transmission to the decoders. Thus, for each output pulse generated by generator 16, a burst signal is transmitted in the following time slot at a discrete frequency indicative of the particular generator output terminal the pulse appeared on. In all, ten such bursts may be transmitted for each air code burst interval, one in each of the ten reserved time slots. Only when generator 16 generates a O or no output control effect will no burst be produced. In the decoder frequency selective detectors convert the bursts back into code pulses on six respective terminals from which the rectangular switching signal is reconstructed in a manner complementary to the generation process just described.

In practice, it is not desirable to leave the rectangular switching signal mode selection purely to the haphazard appearance of ten pulses, since that would involve the likelihood of a mode change with every field. Instead, the encoder includes circuitry which inhibits the operation of the random pulse generator to the extent necessary to force a particular switching signal mode. For instance, assuming that it is desired to continue to operate with a rectangular switching signal of the 4C mode as in FIG. 2, it is necessary to reset the seven pulse counter at the mode transition point between time slots 16 and 17. In order for this to occur, the rectangular switching signal must transition from a C state in time slot 16 to a B state in time slot 17 to obtain a C to B transition. Since the pulse generator is normally completely random, the only way to insure this transition is to inhibit the generator from producing certain output pulses which would not force the required transition. Specifically, during time slot 15, A and B pulses are inhibited since these would prevent the necessary C state in time slot 16. In time slot 16 the rectangular switching signal must transition to the B state, so C, D, E and O pulses are inhibited. Once the transition has taken place, it is necessary to insure that a C state will exist in time slot 20, so A and B are inhibited, the only two outputs which would if generated change the already existing C state to a B state.

It must be understood that in inhibiting a particular output pulse from random pulse generator 16, the inhibited output state is actually removed from the random selection and the chances for one of the other states being selected are improved. This makes it possible to force a particular output pulse by inhibiting all other states from consideration.

While the mode of the rectangular switching signal could be set manually by means of a pair of switches designating the numeric portion 1–7 and the terminal state B/C of the mode, it is preferable for security reasons to randomly select a new mode at random intervals during normal operation of the system. To this end the encoder includes a mode change control circuit 24 which produces a control signal at random intervals for initiating a change in the rectangular switching signal mode. The control signal is applied to one input of an AND gate and serves as an enabling signal for that device. When and only when control circuit 24 calls for a mode change, a random selection of a new mode is accomplished by feeding random noise pulses from a noise generator 25 through an AND gate 26 and into a seven-position mode select counter 27 and a two-position B/C mode select counter 28 for a predetermined period of time. When the counting period has ended, the seven-position counter will unpredictably occupy one of its seven states, thus randomly designating the numeric portion of the new operating mode. Similarly, the two stage counter will occupy one of its two states, thus randomly designating whether the new mode will be a B mode or a C mode.

The 1–7 numeric selection of the counter appears as a single enabling signal at a respective one of seven output terminals. These terminals are in turn connected to respective ones of seven NAND gates 29–35, the other inputs of the gates being connected to sources of timing pulses occurring three time slots prior to the particular time slot in which the mode associated with the particular seven position counter output calls for a mode change. For example, should the counters call for a mode 4C rectangular switching signal, the 4 output terminal only of counter 27 would be high, enabling only NAND gate 32. The other input of gate 32 is connected to a source of timing pulses coinciding with time slot 14, henceforth designated TP14. The outputs of gates 29–35 are connected together to form a common output consisting of a single pulse MN three time slots prior to the mode change point. The MN pulse, in this case TP14, is applied to an inhibit logic control circuit 36, which responds to the MN pulse by generating as M6 control pulse three time slots prior to the mode change, an M7 control pulse two time slots prior to the mode change, and a post-mode or PM control pulse between one time slot prior to the mode change and the end of the air code burst interval. These assignments take into account the one-line delays introduced by multivibrator 14 and air code burst generator 23. In our example M6 would coincide with slot 14, M7 with slot 15, and MN with slots 16–20, inclusive. These three control pulses, together with the output of the B/C counter, are applied to inhibit logic circuits 18 and utilized therein to set up the necessary function inhibit signals preceding and following the mode change.

In determining which functions are to be inhibited, logic circuits 18 take into account the desired mode via the M6, M7, PM and B/C counter output signals, the present state of the rectangular switching signal via the B and C outputs of multivibrator 14, and the prior occurrence of D and E pulses to determine whether a correlation or end of program pulse can or should be transmitted during a particular air code burst interval. The output of logic circuits 18 is in the form of inhibit pulses for the various functions, namely $\overline{A}$, $\overline{B}$, $\overline{C}$, $\overline{D}$, $\overline{E}$ and $\overline{O}$. With the exception of the O signal, which is coupled directly, these function inhibit signals become inhibit signals for the six possible output states 1–6 of random pulse generator 16 by means of a second program transposition matrix 37, which couples the function inhibit signals to appropriate inhibit inputs $\overline{1}$–$\overline{6}$ of generator 16 with the same permutations provided by matrix 17. Thus, when inhibit logic circuit 18 calls for no B to be transmitted during a particular one of the ten air code burst interval time slots, it outputs a $\overline{B}$ signal which becomes a $\overline{5}$ signal and prevents random pulse generator 16 from generating a 5 pulse during that time slot.

Figure 3:
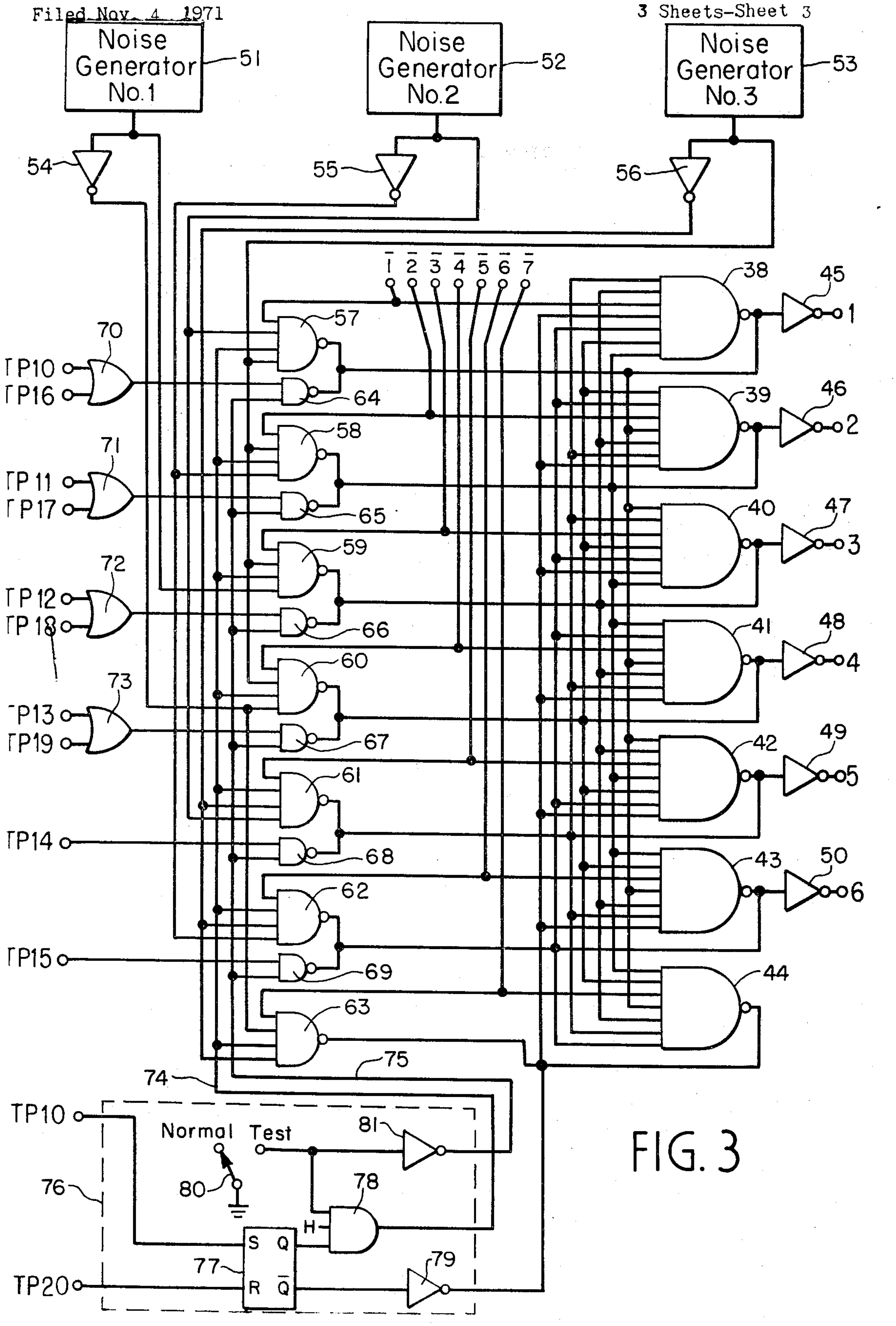
FIG. 3 is a schematic diagram, partially in block diagram form, of an inhibitable random pulse generator constructed in accordance with the invention.

Having considered the operation of the encoder as a system, we are now in a position to consider in detail the novel circuitry of inhibitable random pulse generator 16, which is shown in FIG. 3 and to which the present invention is directed. Referring to FIG. 3, there exists in generator 16 seven logic elements in the form of NAND gates 38–44, each having seven input terminals and one output terminal. Each of these NAND logic elements, as is well known to the art, has two operating states. These states are generally defined in terms of high and low voltage conditions, a high voltage condition being approximately the reference or supply voltage, generally in the order of 5.0 volts for the most common logic elements, and a low being some value less than reference, generally near or equal to 0 volts or ground potential. In the first or so-called low state, the output terminal of the gate is low if and only if all of the input terminals of the device are high. Conversely, the output terminal is high if any one or more of the input terminals is low.

In accordance, with one aspect of the invention, the output terminal of each gate is connected to an assigned individual one of the input terminals of each of the other gates to make the gates mutually exclusive. That is, it is possible for one and only one of the seven NAND gates to be in a low state at one time. This result obtains because the low output of the first NAND gate to assume a low state constitutes an inhibit input to all of the other NAND gates. Specifically, in the embodiment of FIG. 3 a low output from any one of the seven NAND gates 38–44 is applied to an input of each of the other gates, so that the first of the seven NAND gates to become low inhibits the other six gates from also becoming low. To determine which of the seven gates is low, the output terminals of the gates may be connected to external indicating or utilization circuitry directly or as in the embodiment of FIG. 3, serially through respective ones of inverter 45–50 to output terminals 1–6. Furthermore, to force a selected one of the gates into a low state, regardless of which of the others is low, it is only necessary to momentarily apply a low control signal on the output terminal of the selected gate. This signal, because of the previously described interconnections, will force all of the other gates high, including the existing low gate. This will in turn render all of the input terminals to the selected gate high to sustain the low state in the selected gate, even after the removal of the momentarily applied control signal.

It will be appreciated that the afore-described interconnection scheme results in a storage or memory circuit wherein a discrete state is assumed indicative of the last of the logic NAND elements to receive a control pulse. In addition to its use as a random pulse generator in the subscription television system the multiple-state memory circuit described herein would have many other uses. For instances, it could be used as a storage stage for a varactor-tuned television or radio tuner, wherein one of the NAND gates is user-activated to apply a predetermined control voltage to a varactor timing element.

Returning to FIG. 3, to achieve random actuation of the seven NAND gates 38–44, an individual source of negative-polarity random noise pulses is coupled to the output terminals of each of the seven gates. This has the effect of the previously mentioned control pulse, the first gate to receive such a noise pulse from its associated noise source becoming low as noise pulse inhibits the other six gates to render all of its inputs high. Should a noise pulse now be applied to the output of one of the other now inhibited (high) gates, the low gate will become high as the second negative-polarity noise pulse appears on one of its input terminals. Since all of the other inhibited NAND gates also have this negative noise pulse on one of their input terminals, the inputs to the AND gate to which the pulse was applied will all be high and the gate will become and remain low, even after the occurrence of the noise pulse. Thus, a subsequent noise pulse will always render a previously low gate high and render low the gate to which the pulse was applied. As we will see, with additional control circuitry this characteristic is ideally suited for an inhibitable random pulse generator.

To achieve true randomness as to which of the seven gates 38–44 becomes low, it is necessary to utilize individual discrete noise sources for each gate. To provide seven such sources without the expense of providing seven different noise generators, seven combining circuits are incorporated into generator 16. More particularly, random pulse generator 16 includes three random noise generators 51–53, which may be any one of a number of conventional designs. Associated with each of the three noise generators is a respective one of inverters 54–56, which invert the output of their associated noise generator to form a second inverted-noise source from each of the generators.

To form the necessary seven individual noise signals, the inverted and non-inverted outputs of the three generators are combined in various pairs by seven four-input logical NAND gates 57–63. The exact pairing is not critical, but it is imperative that the signals paired be generated by different noise sources. Furthermore, to maintain the same average duty cycle for each of the resulting seven noise sources, each of the signals must result from the same number of combining processes, in this case one. If we arbitrarily identify the signals from sources 51–53 as X, Y and Z, and their inverted counterparts as $\overline{X}$, $\overline{Y}$ and $\overline{Z}$ then in the present embodiment the noise source for gate 38 comprises sources X and Z, for gate 41 sources $\overline{X}$ and Z, for gate 42 sources $\overline{Z}$ and Y, for gate 43 sources $\overline{Z}$ and $\overline{Y}$, and for gate 44 sources $\overline{X}$ and $\overline{Z}$. In each case the required signals are coupled to respective inputs on the indicated gates and the remaining inputs are reserved for inhibit and control functions which will be described shortly. The output of each of the noise combining NAND gates 57–63 is applied to a respective one of the outputs of NAND gates 38–44.

As has been explained, a necessary feature of the random pulse generator is the capability of having one or more of its possible output states inhibited. To that end, the negative function inhibit signals from logic control circuit 18 are aplied via transposition matrix 37 to reserved inputs on AND gates 38–44 and 57–63. Specifically, the generator has seven input terminals $\bar{1}$–6 and $\bar{0}$ for receiving like-identified inhibit signals, and these inputs are connected directly to reserved inputs of NAND gates 57–63 and 38–44, respectively. Thus, when a particular inhibit signal is present the associated NAND gate is inhibited, preventing a noise pulse from forcing the particular gate into a low state. This has the effect of limiting selection to the remaining non-inhibited gates and increasing the likelihood that any particular one will be selected.

To facilitate adjustment and repair of the encoder and associated decoders, generator 16 includes provision for operating in a non-random test mode wherein a second set of six dual-input logical NAND gates 64–69 provide, as a substitute for the random noise pulses from gates 59–63, a series of regularly occurring predictable pulses for activating gates 38–44. Specifically, in a so-called fixed-frequency test mode generator 16 is called upon to generate output pulses of the format 1–2–3–4–5–6–1–2–3–4 during each air code burst interval. To this end one input of each of NAND gates 64–69 is coupled to a source of pulses coincident with the time slot or slots in which the output pulse associated with that particular gate must be generated. For instance, a 1 output must be produced during the first and seventh time slots of the ten slot air code burst interval. Referring to our numbering scheme in FIG. 2, this corresponds to time slots 10 and 16, or timing pulses TP10 and TP16. To maintain isolation between these timing pulse sources the timing pulses are combined in a logical OR gate 70 prior to application to NAND gate 64. Similarly, an OR gate 71 is provided for applying TP11 and TP17 to gate 68, an OR gate 72 for applying TP12 and TP18 to gate 66, and an OR gate 73 for applying TP13 and TP19 to gate 67. Output pulses 5 and 6 appear only once in time slots 15 and 16, so only single timing pulses TP14 and TP15 are applied to these gates. The zero or no output condition does not exist in the test mode, so no timing pulse is provided to generate that output.

To switch generator 16 from a normal random-output mode of operation to a test mode of operation, it is necessary to inhibit gates 57–63 to prevent the application of noise to gates 38–44. To this end a control line 74 is provided and connected to the remaining input of each of the NAND gates 57–63. This control line is high during normal operation, enabling the seven gates, and low during test mode operation to disable the gates and prevent the application of noise pulses to gates 38–44. To prevent the application of timing pulses during normal operation a second control line 75 is provided and connected to the remaining inputs on each of the timing pulse input gates 64–69. This control line is high during test-mode operation, enabling gates 64–69, and low during normal operation to disable the gates and prevent the application of timing pulses to gates 38–44.

To establish the proper control voltages on control lines 74 and 75 the generator includes a control stage 76. This stage comprises an RS flip-flop 77, the Q or set output of which is coupled to one input of a three-input logical AND gate 78, the other inputs of which are coupled to a source of positive-polarity horizontal pulses and a normal-mode-inhibit control line, respectively. Thus, when flip-flop 77 is in its set state and the control line is high, gate 78 is enabled and positive-polarity horizontal pulses are translated therethrough. The output of gate 78 is connected to control line 74, and the horizontal pulses thus translated enable NAND gates 57–63 during their occurrence to apply random pulses to gates 38–44. Thus, during the predetermined period of time defined by the occurrence of a horizontal retrace pulse, gates 38–44 each receive random noise pulses from their individual sources, gates 57–63, respectively. Because the individual sources are independent and of themselves random, it follows that in the absence of external inhibit signals a random one of the seven gates 38–44 will be low at the end of the predetermined period of time, i.e., the horizontal retrace period. The output terminal associated with the gate thus selected will be high, constituting the generator output pulse for the duration of the following horizontal scanning interval or time slot and until the occurrence of the next horizontal retrace pulse.

The reset or $\bar{Q}$ output of flip-flop 77 is coupled via an inverter 79 to the output of NAND gate 44. Thus, when flip-flop 77 is in its reset state a continuous low signal is aplied to the output of gate 44. This signal causes gate 44 to become low in the manner previously explained, forcing a 0 or no-output condition to exist. This is equivalent to completely disabling the generator, since a 0 stage produces no output.

RS flip-flop 77 is periodically switched to its set state by a TP10 timing pulse applied to its set input terminal, and to its reset state by TP20 timing pulse applied to its reset input terminal. This has the effect of activating the generator during air code burst intervals, and not during vertical scanning intervals when its operation could possibly cause interference to other circuitry and possible degradation of the reproduced picture.

In the test operating modes no randomness is desired, so function switch 80 prevents the translation of random noise pulses to gates 38–44 by grounding one input of NAND gate 78. This has the effect of a logical O, effectively disabling that device and preventing further application of horizontal retrace enabling pulses to gates 64–69. Also, in the test mode switch 80 grounds the input of inverter 81, which forces control line 75 high and enables gates 64–69. This is desirable, since these gates constitute the timing pulse sources necessary for generating the repetitive predictable output signal required in the test mode.

In a normal operating mode random noise pulses are periodically applied during horizontal retrace intervals in the air code burst interval to NAND gates 38–44 to cause the low one of the gates to vary in a random manner. This continues until the end of the retrace interval, at which time the application of noise is terminated and the last gate to receive a noise impulse remains conductive during the succeeding time slot. It is only at this time that the output of the generator, a single control signal representative of the conduction state of gates 38–44, is utilized by the logic and burst generating circuitry as previously described. In this respect, it will again be mentioned that air code burst generator 23 and multivibrator 14 introduce a one-line delay, so that the code determination made during a given horizontal interval or time slot is not effective until the following time slot. Furthermore, video switch 10 introduces another one-line delay to accommodate the decoding process in the decoders, so the actual reconstructed switching signal in the decoder is two lines delayed.

Thus, a novel inhibitable random-pulse generator has been shown and described which operates in the manner of an electronic "roulette wheel," providing one of seven possible output conditions for each activation. The generator features a multiple-state memory circuit comprising a novel mutually-exclusive combination of logical NAND elements, activated by suitable random noise and timing pulses. Furthermore, the generator contains additional circuitry for disabling the random selection process to accommodate certain test functions to facilitate testing and repair of the encoder and associated decoders. The circuitry employed is unique and economical to construct, and makes maximum use of solid-state flip-flop stages and other packaged logic elements for greater reliability, lower cost, and lower space requirements. Moreover, it must be appreciated that while the circuit has been shown as a seven-state circuit in the embodiment of a subscription television encoder, it would be applicable to other uses where an inhibitable source of random pulses having possibly more or less states is required.

While a particular embodiment of the invention has been shown and described, it will be obvious to those skilled in the art that changes and modifications may be made without departing from the invention in its broader aspects, and, therefore, the aim of the appended claims is to cover all such changes and modifications.

We claim:

1. A random pulse generator for use in a subscription television system or the like comprising:

first, second and third logic elements each having at least two input terminals and an output terminal, and each normally occupying a first state but assuming a second state in the presence of a predetermined control effect on one or more of said input terminals, and each producing a control effect representative of its occupied state at said output electrode;

means for coupling the control effect from said first logic element to one input terminal on each of said second and third elements to restrict said second and third elements to said second state when said first element is in said first state;

means for coupling the control effect from said second logic element to one input termial of said first element and the remaining input terminal of the third element to restrict said first and third elements to said second state when said second element is in said first state;

means for coupling the control effect from said third logic element to the remaining input terminals of said first and second elements to restrict said first and second elements to said second state when said third elements is in said first state;

first, second and third sources of random noise pulses having sufficient amplitude and proper gender for restricting said elements to said second state; and means for applying said random noise pulses from said first, second and third sources to the output terminals of said first, second and third logic elements, respectively, to cause the one of said elements last to receive one of said random noise pulses to assume said first state.

2. A random pulse generator as described in claim 1 wherein said logic elements are logical AND gates.

3. A random pulse generator as described in claim 1 wherein said logical elements are NAND gates.

4. A random pulse generator as described in claim 3 wherein said first and second states comprise the low and high states of said NAND gates, respectively, and wherein said output control effect from said gate and said predetermined input control effect for restricting said gates to said high state are one and the same.

5. A random pulse generator as described in claim 1 wherein at least one of said logic elements includes an additional input terminal, and wherein are provided inhibiting means for applying a control effect to said additional input terminal to restrict said logic element to said second state.

6. A random pulse generator as described in claim 1 wherein are provided means for selectively disabling the application of said random noise pulses to said first, second and third logic elements and instead applying thereto a series of pulses to render said elements cyclically conductive in a predetermined order.

References Cited

UNITED STATES PATENTS

| | | | |
|---|---|---|---|
| 3,399,351 | 8/1968 | Reszka | 328—63 X |
| 3,474,262 | 10/1969 | Turcotte | 307—215 X |
| 3,564,448 | 2/1971 | Watkins | 328—63 X |

JOHN S. HEYMAN, Primary Examiner

U.S. Cl. X.R.

307—215; 331—78